United States Patent
Fujioka et al.

(10) Patent No.: US 12,358,139 B2
(45) Date of Patent: Jul. 15, 2025

(54) ROBOT SYSTEM

(71) Applicant: FANUC CORPORATION, Yamanashi (JP)

(72) Inventors: Naoki Fujioka, Yamanashi (JP); Kazuki Wakabayashi, Yamanashi (JP); Keita Suyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 119 days.

(21) Appl. No.: 18/554,820

(22) PCT Filed: May 19, 2021

(86) PCT No.: PCT/JP2021/018905
§ 371 (c)(1),
(2) Date: Oct. 11, 2023

(87) PCT Pub. No.: WO2022/244127
PCT Pub. Date: Nov. 24, 2022

(65) Prior Publication Data
US 2024/0190001 A1   Jun. 13, 2024

(51) Int. Cl.
*B25J 9/16* (2006.01)
*B25J 13/08* (2006.01)
*B25J 19/02* (2006.01)

(52) U.S. Cl.
CPC ............ *B25J 9/1664* (2013.01); *B25J 9/162* (2013.01); *B25J 9/163* (2013.01); *B25J 9/1638* (2013.01);
(Continued)

(58) Field of Classification Search
CPC . B25J 9/1664; B25J 9/162; B25J 9/163; B25J 9/1638; B25J 9/1653; B25J 13/085; B25J 19/02; B25J 13/086; B25J 5/007
See application file for complete search history.

(56) References Cited

U.S. PATENT DOCUMENTS

| | | | |
|---|---|---|---|
| 2021/0050011 A1* | 2/2021 | Sawata | G10L 15/22 |
| 2021/0072755 A1* | 3/2021 | Chae | G05D 1/0214 |
| 2021/0197371 A1* | 7/2021 | Huang | B25J 13/085 |

FOREIGN PATENT DOCUMENTS

| | | |
|---|---|---|
| JP | H01289684 A | 11/1989 |
| JP | 2003266349 A | 9/2003 |

(Continued)

OTHER PUBLICATIONS

Yamazaki, et al., "Motion Planning for a Mobile Manipulator with Several Grasping Postures", Preprints of The 24th annual conference of the Robotics Society of Japan, The Robotics Society of Japan, Tokyo, Japan, 10 pages.

*Primary Examiner* — Michael C Zarroli
(74) *Attorney, Agent, or Firm* — Maier & Maier, PLLC (57) ABSTRACT

A robot system includes: a robot where a hand for handling a workpiece is mounted; a movement mechanism to change the relative positions of the robot and workpiece; a workpiece sensor to detect the position of the workpiece; an obstacle sensor to detect the position of a surrounding obstacle; and a control device that controls the robot and the movement mechanism. The robot includes a load sensor to detect a load acting on an operating axis of the robot. The control device generates a first map of arrangements of the workpiece and the obstacle from the detected position of the workpiece and position of the obstacle, generates a second map of a degree of influence on the lifetime of the robot for each relative positioning by the movement mechanism, and determines the relative positioning by the movement mechanism on the basis of the generated first map and second map.

8 Claims, 11 Drawing Sheets

(52) U.S. Cl.
CPC ........... *B25J 9/1653* (2013.01); *B25J 13/085* (2013.01); *B25J 19/02* (2013.01); *B25J 9/1697* (2013.01)

(56) References Cited

FOREIGN PATENT DOCUMENTS

| | | | |
|---|---|---|---|
| JP | 2010214544 | A | 9/2010 |
| JP | 2016059990 | A | 4/2016 |
| JP | 2017047518 | A | 3/2017 |
| JP | 2017523054 | A | 8/2017 |
| JP | 2019081206 | A | 5/2019 |
| WO | 2016010614 | A1 | 1/2016 |
| WO | 2016135861 | A1 | 9/2016 |

* cited by examiner

ROBOT SYSTEM

TECHNICAL FIELD

The present disclosure relates to a robot system.

BACKGROUND

There is a known autonomous proximity control device that searches for an optimal route for reaching a target value of a movement mechanism on which a robot is mounted (for example, see Japanese Unexamined Patent Application, Publication No. Hei 1-289684). This autonomous proximity control device is given the initial value and the target value of the movement mechanism and searches for a movement route of the movement mechanism for reaching the target value from the initial value.

SUMMARY

An aspect of the present disclosure is a robot system including: a robot on which a hand for handling a workpiece is mounted; a movement mechanism that can change relative positions of the robot and the workpiece; a workpiece sensor that can detect a position of the workpiece with respect to the robot; an obstacle sensor that can detect a position of a surrounding obstacle with respect to the movement mechanism; and a control device that controls the robot and the movement mechanism, wherein the robot includes a load sensor that can detect a load acting on at least one of operating shafts of the robot, and the control device generates a first map that indicates arrangements of the workpiece and the obstacle from the position of the workpiece detected by the workpiece sensor and the position of the obstacle detected by the obstacle sensor, generates a second map that indicates a degree of influence on a lifetime of the robot for each of the relative positions set by the movement mechanism on a basis of the load detected by the load sensor when the workpiece is lifted up by the hand, and determines the relative positions set by the movement mechanism on a basis of the generated first map and second map.

DETAILED DESCRIPTION OF EMBODIMENTS

A robot system 1 according to an embodiment of the present disclosure will be described below with reference to the drawings.

Figure 1:
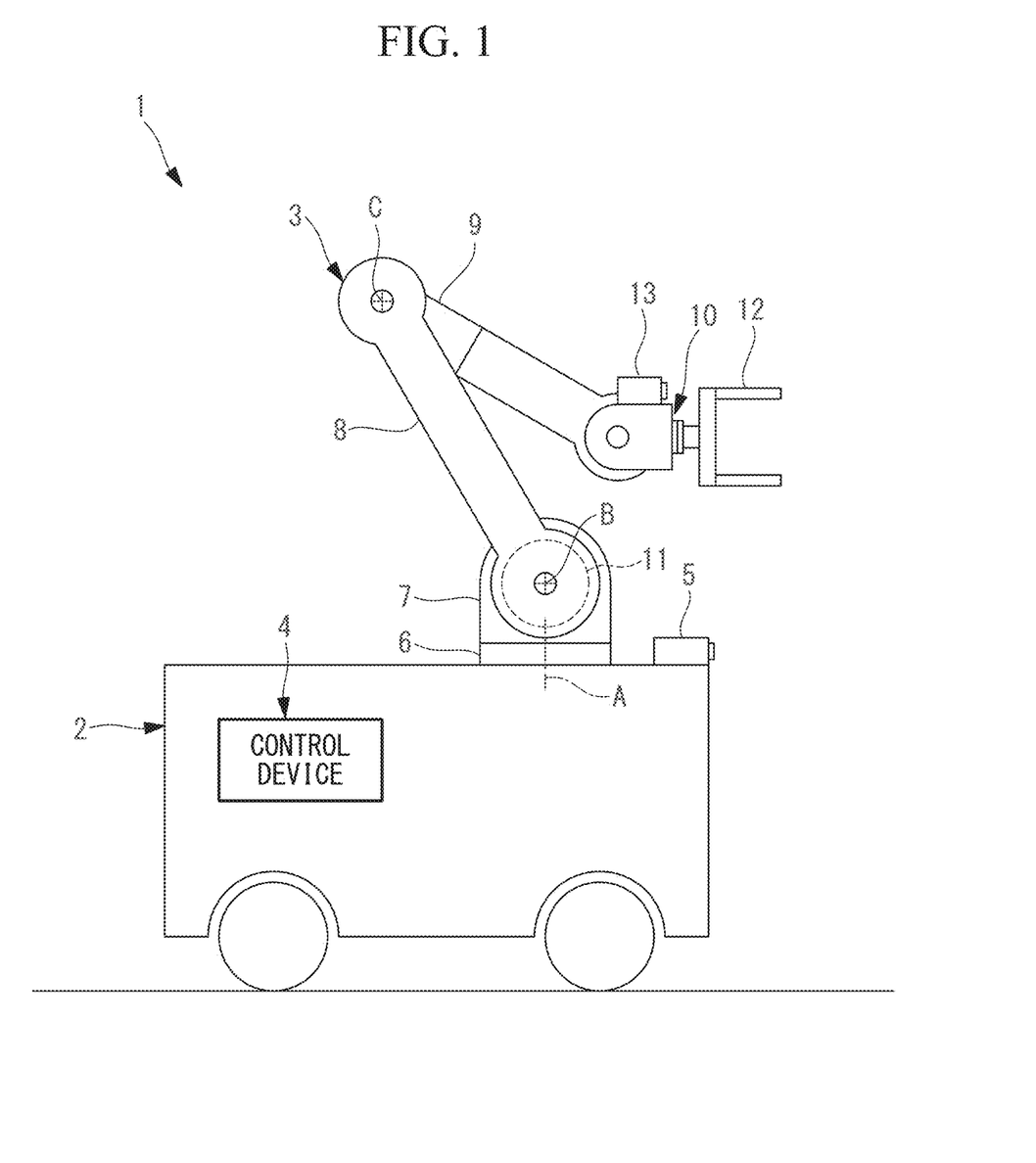
FIG. 1 is an overall configuration diagram showing a robot system according to an embodiment of the present disclosure.
Figure 2:
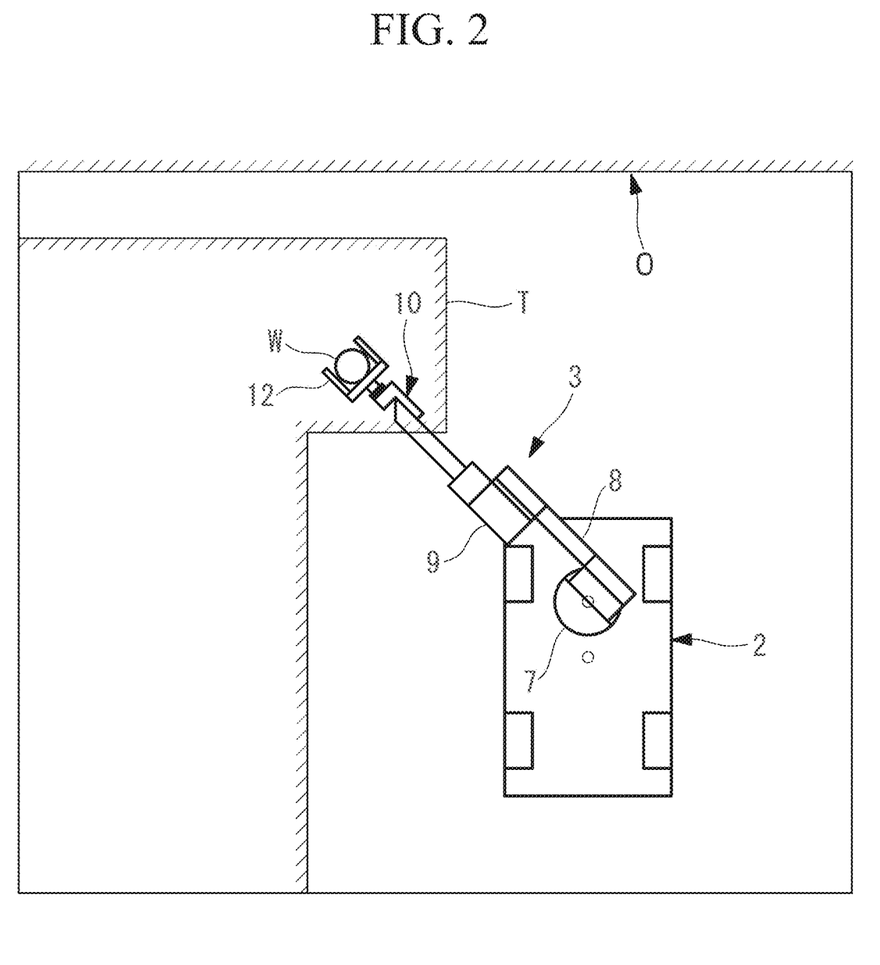
FIG. 2 is a plan view for explaining a first map in the robot system in FIG. 1.

As shown in FIG. 1, the robot system 1 according to this embodiment includes an Automated Guided Vehicle (AGV, movement mechanism) 2, a robot 3 mounted on the AGV, and a control device 4 that controls the AGV 2 and the robot 3. With this robot system 1, for example, as shown in FIG. 2, work is performed by picking up, by means of the robot 3, a workpiece W supplied to a work table T.

The AGV 2 is a four-wheel self-driving trolley that can travel on a horizontal floor surface, the AGV including an obstacle sensor 5, such as a vision sensor or a range sensor, that can detect a peripheral obstacle O. The obstacle O includes structures and the work table T on which the workpiece W is mounted, which are in a space in which the AGV 2 is operated (indicated by hatching in FIG. 2). The AGV 2 can recognize its own horizontal-direction position by means of, for example, a sensor, such as an encoder or a GPS.

The robot 3 is, for example, a six-axis articulated robot including a turning barrel 7 that can be rotated about a vertical first axis A with respect to a base 6 installed on a top surface of the AGV 2 and a first arm 8 that can be rotated about a horizontal second axis B with respect to the turning barrel 7. In addition, the robot 3 includes a second arm 9 that can be rotated about a horizontal third axis C with respect to the first arm 8 and a three-axis wrist 10 that is attached to a distal end of the second arm 9. The robot 3 includes torque sensors (load sensors) 11 that can detect torques (loads) that act on respective operating shafts.

At a distal end of the wrist 10, a hand 12 that can handle the workpiece W by means of grasping, suction, or the like is attached. In addition, a workpiece sensor 13, such as a vision sensor or a range sensor, that can detect the position of the workpiece W is mounted to the robot 3.

The control device 4 includes at least one processor and a memory.

Figure 3:
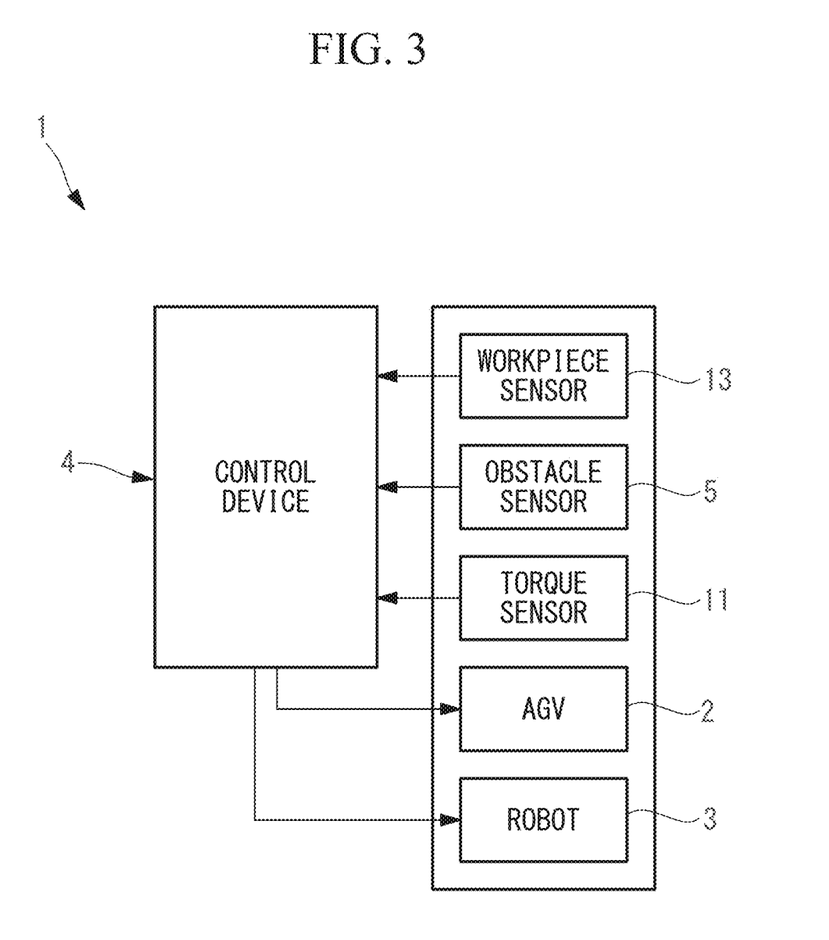
FIG. 3 is a block diagram showing the robot system in FIG. 1.

As shown in FIG. 3, the control device 4 receives inputs of the position of the workpiece W detected by the workpiece sensor 13, the position of the obstacle O detected by the obstacle sensor 5, and the torque loads of one or more operating shafts detected by the torque sensors 11. In addition, the control device 4 controls the AGV 2 and the robot 3 by employing the input positions and torque loads.

The control device 4 performs the following processing.

First, the workpiece sensor 13 detects the position of the workpiece W, and the obstacle sensor 5 detects the position of the obstacle O. Then, from the detected positions of the workpiece W and the obstacle O, a two-dimensional first map representing the arrangements of the workpiece W and the obstacle O is generated.

Figure 4:
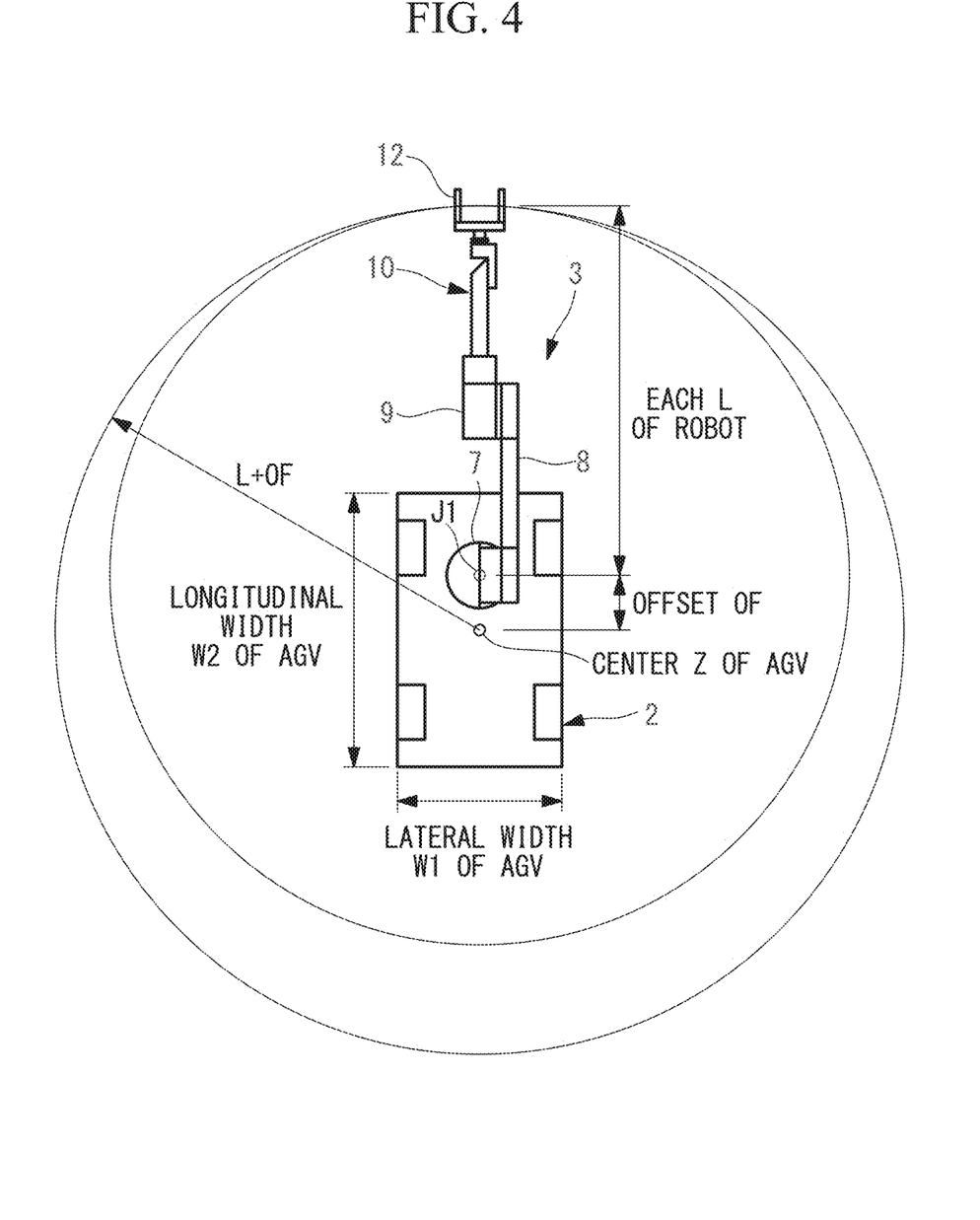
FIG. 4 is a plan view of the robot system in FIG. 1.
Figure 5:
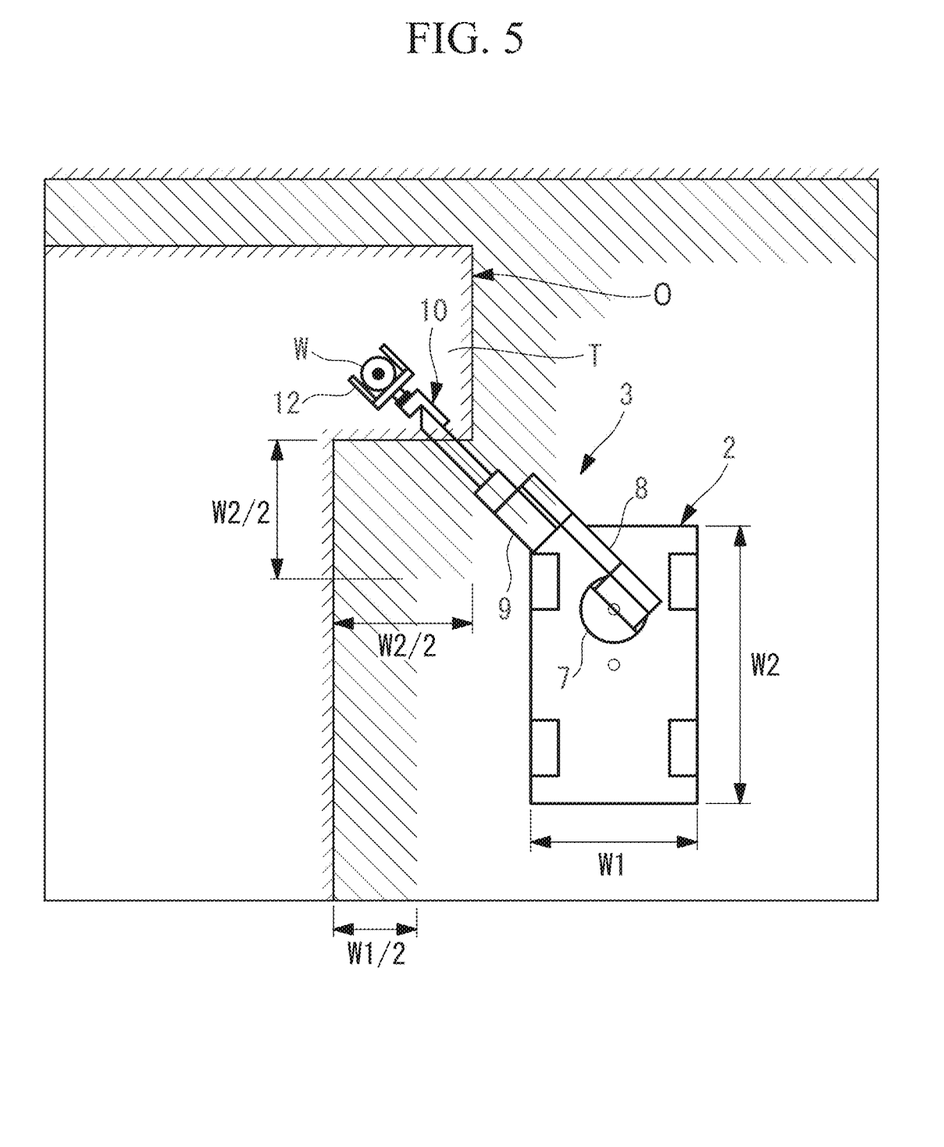
FIG. 5 is a plan view showing a region that a center position of an AGV cannot approach on the first map in FIG. 2.

The first map is, for example, as shown in FIG. 2, a two-dimensional map of the obstacle O that hinders the operation of the AGV 2, and is created in a world coordinate system. As shown in FIGS. 4 and 5, on the first map, a region that a center position Z of the AGV 2 cannot approach is defined as a region extending to positions that are offset from a surface of an obstacle O by amounts corresponding to ½ of dimensions of a lateral width W1 and a longitudinal width W2 of the AGV 2 (indicated by hatching in FIG. 5).

In addition, the control device 4 generates a second map that indicates, for each position of the AGV 2, the degree of influence on the lifetime of the robot 3. The second map is a grid map and is created in accordance with, for example, the following procedures.

First, the control device 4 prompts an operator to manually operate the AGV 2 and the robot 3 such that, at an appropriate position of the AGV 2, the workpiece W on the work table T is grasped by the hand 12 mounted on the robot 3 and the workpiece W is lifted up enough to be separated from the work table T.

In this state, a posture H0 of the hand 12, a posture P0(j) of the robot 3, a reference position Z0 and a posture r0 of the AGV 2, and a torque T0(j) of each shaft detected by the load sensor 11 are stored.

Figure 6:
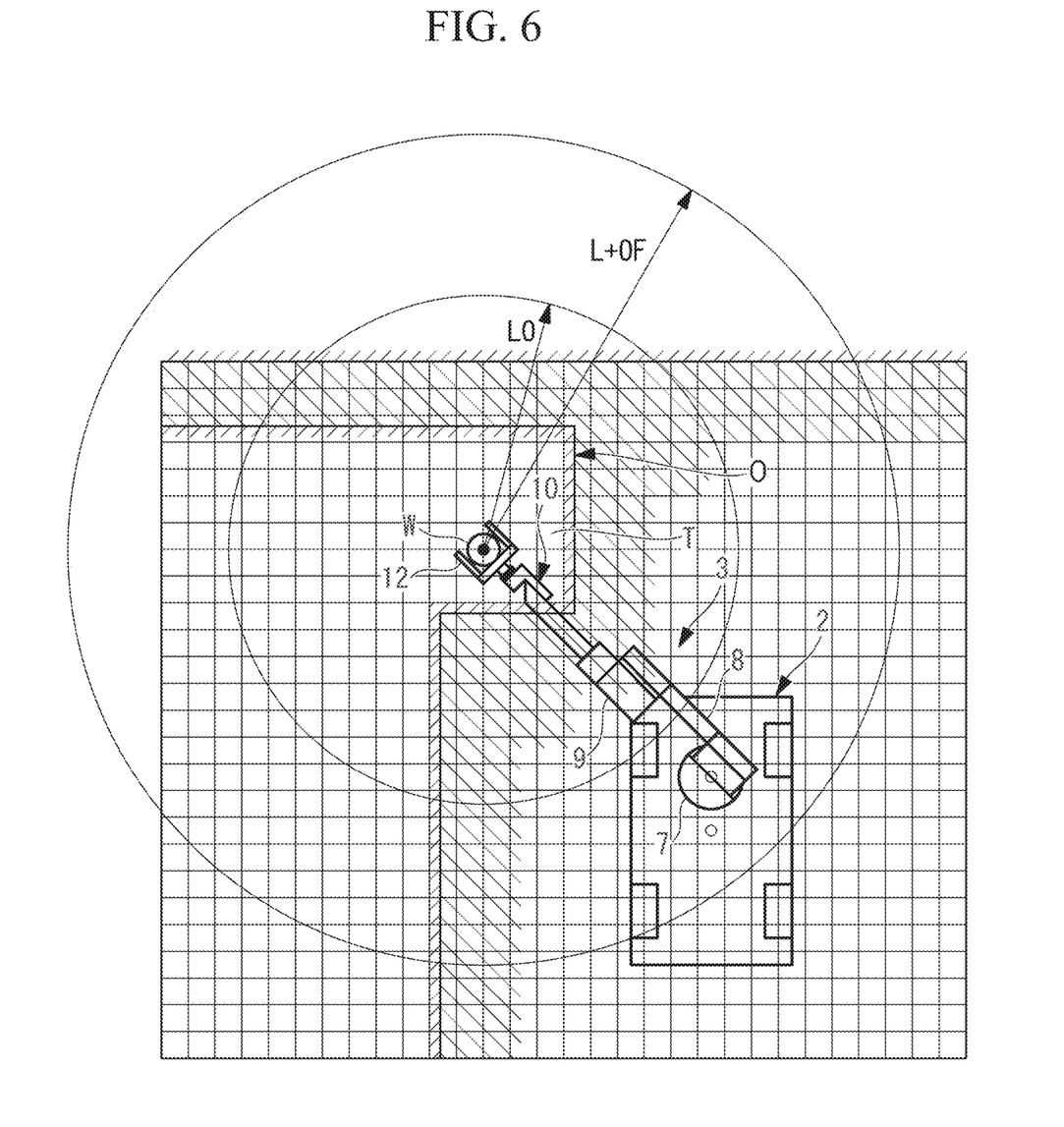
FIG. 6 is a plan view for explaining a second map in the robot system in FIG. 1.

Next, the control device 4 generates, for example, a grid map (frame) containing numerous grid squares in which one side thereof corresponds to the movement resolution of the AGV 2 with reference to the reference position Z0 of the AGV 2, as shown in FIG. 6. Then, in the case in which the reference position Z0 of the AGV 2 is disposed at a center position of each of the grid squares of the grid map, the posture of the robot 3 in which the stored posture of the hand 12 could be assumed is calculated.

Here, the grid squares for which the postures of the robot 3 are calculated are limited to, among all of the grid squares defined in FIG. 6, the grid squares that are inside a circle having a radius L+OF centered on the workpiece W. As shown in FIG. 4, L is the reach of the robot 3 and OF is the amount by which the first axis of the robot is offset in a horizontal direction with respect to the reference position Z0 of the AGV 2.

In addition, the grid squares that are set in the first map, that are disposed farther on the AGV side than the obstacle, and in which the region in which the reference position Z of the AGV could not approach reaches centers thereof are excluded from the grid squares for which the postures of the robot 3 are calculated.

Figure 7:
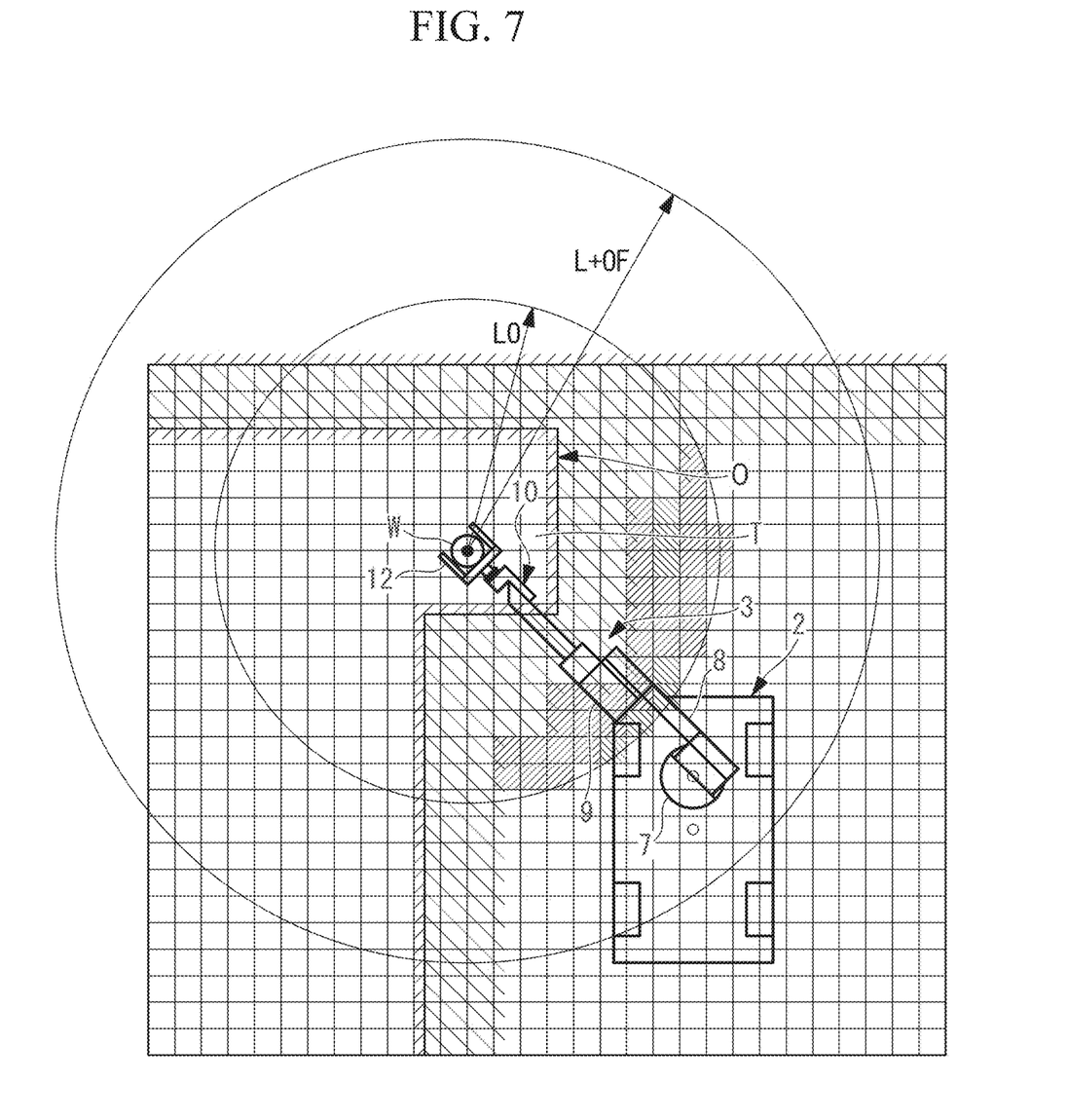
FIG. 7 is a plan view showing the magnitudes of torque loads on respective operating shafts of a robot on the second map in FIG. 6.
Figure 8:
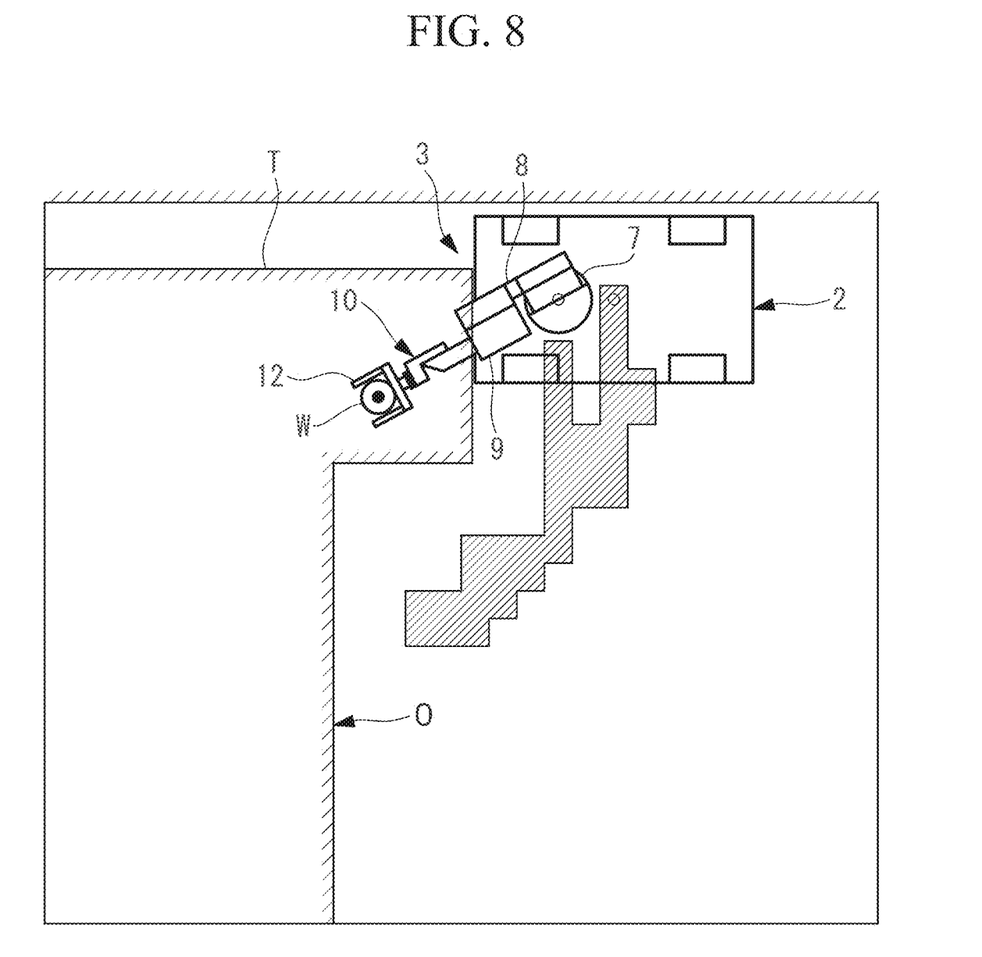
FIG. 8 is a plan view showing example postures of the robot and the AGV in the robot system in FIG. 1.
Figure 9:
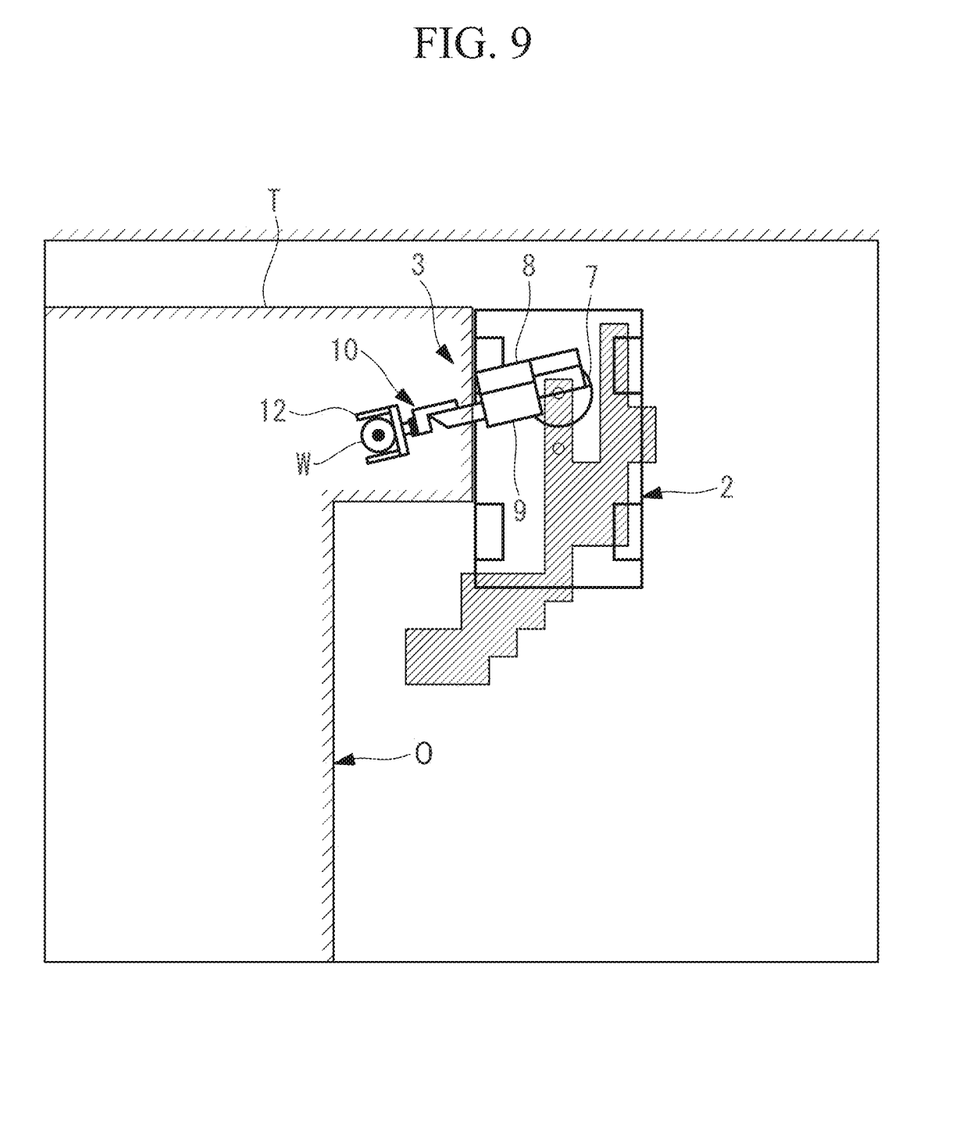
FIG. 9 is a plan view showing other example postures of the robot and the AGV in the robot system in FIG. 8.
Figure 10:
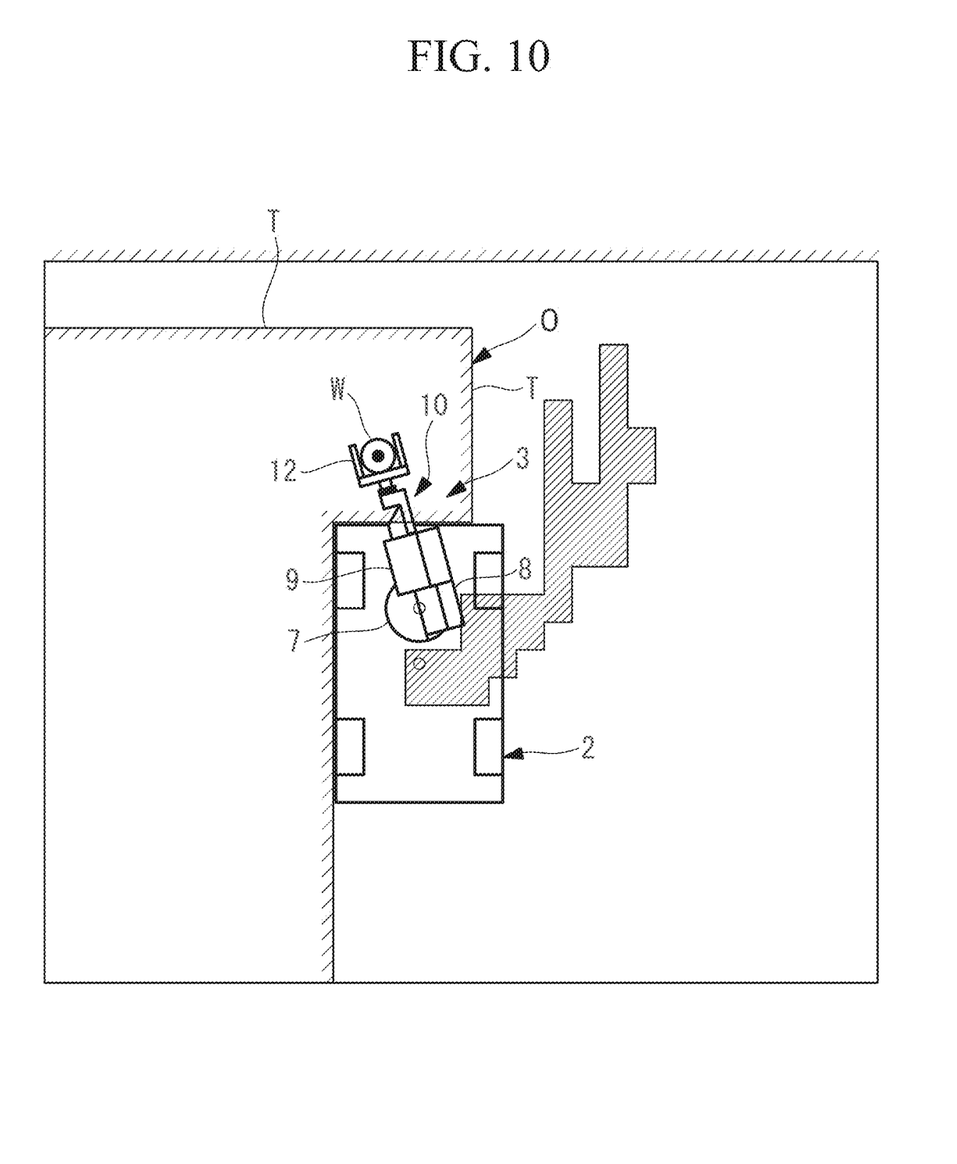
FIG. 10 is a plan view showing other example postures of the robot and the AGV in the robot system in FIG. 8.
Figure 11:
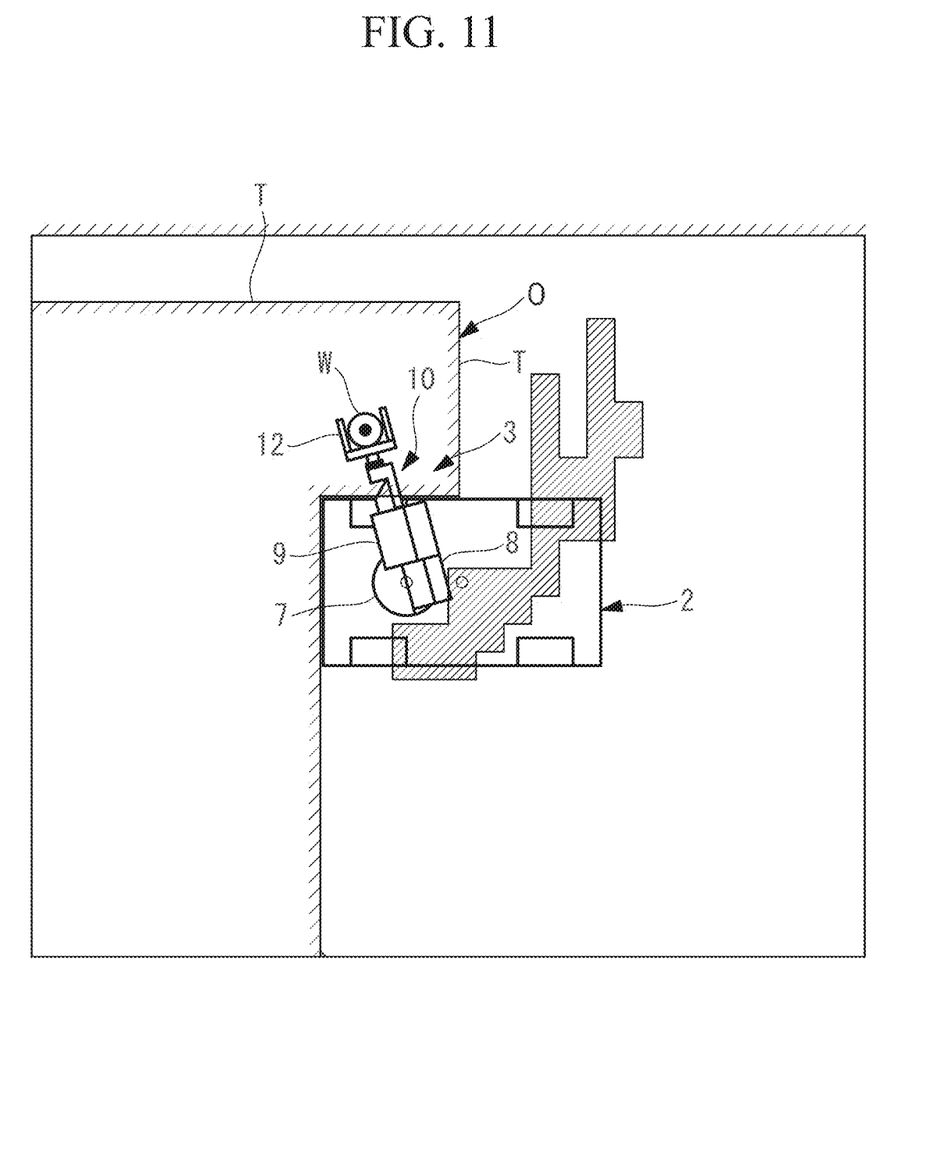
FIG. 11 is a plan view showing other example postures of the robot and the AGV in the robot system in FIG. 8.

Furthermore, the torque loads that act on the robot 3 decrease with a decrease in the distance from the workpiece W. Therefore, as shown in FIG. 6, it suffices to calculate the robot postures for the grid squares in which centers thereof are inside a circle having a radius L0 that is sufficiently smaller than the radius L+OF, and K grid squares satisfying the condition are selected. In FIG. 7, the grid squares indicated by dense hatching are grid squares for which the torque loads of the respective operating shafts of the robot 3 are assumed to be smaller than the grid squares indicated by sparse hatching, and are selected as the grid squares for which the postures of the robot 3 are estimated.

The reference position Z of the AGV 2 is disposed in each of the thus-selected grid squares and the posture of the AGV 2 is set to a prescribed posture, and thus, as shown in FIGS. 8-11, it is possible to handle the workpiece W with low torque loads without causing the AGV 2 to interfere with the obstacle O.

On the second map, number k=1 to K is assigned to the thus-selected grid squares, and postures that the robot 3 could assume are estimated, as described below, for the respective grid squares to which the numbers are assigned.

First, a position Wpos of the workpiece W defined in a robot coordinate system fixed with respect to the robot 3 is calculated by using the following function Fw:

$$Wpos=Fw(Wpos\_w, Zk, rm)$$

where Wpos_w is the position of the workpiece W in the world coordinate system stored on the first map, Zk is the center position of the k-th grid square, which serves as the reference position (center coordinates of each grid square) of the AGV 2, and rm is the m-th posture of the AGV 2 (the orientation of the AGV 2).

The posture rm of the AGV 2 is necessary in the case in which the first axis A of the robot 3 is not aligned with the reference position Zk of the AGV 2, because the position of the first axis A of the robot 3 changes as a result of the AGV 2 changing the posture rm about a vertical axis disposed at the reference position Zk. In particular, the posture rm of the AGV 2 is calculated such that m=M where interference between the AGV 2 and the obstacle O does not occur when the angle of the AGV 2 about the reference position Zk disposed at the center of each of the grid squares, selected as described above, is changed from 0° to 360° by a prescribed angle, for example, every 5°.

Subsequently, a posture Px(j) of the robot 3 in which the stored hand posture H0 could be assumed with respect to the workpiece position Wpos is calculated by using the following function Fp:

$$Px(j)=Fp(Wpos, R, Ho)(x)$$

where j is the operating shaft number, x is the number of postures in the case in which there are multiple postures, and R is the angular resolution.

For example, when the angle of the turning barrel 7 about the first axis A of the robot 3 with respect to the base 6 is changed at a prescribed angular resolution R, in the case in which postures of the robot 3 in which the stored posture Ho of the hand 12 could be assumed are obtained at x angles, x postures are calculated. The grid square number k is specified, and the x postures of the robot 3 are calculated in the state in which the posture rm of the AGV 2 is specified.

On the basis of the calculated postures, the stored postures r0 of the robot 3, and the torque loads T0(j) of the respective shafts, torque loads Dx(j) of the respective shafts of the robot 3 in the respective postures are estimated by using the following function Ft:

$$Dx(j)=Ft(P0(j), T0(j), Px(j))$$

Then, from the torque loads of the respective operating shafts in the respective estimated postures, damage amounts Sx(j) of the respective operating shafts of the robot 3 in the respective postures are calculated by using the following function:

$$Sx(j)=Fs(Dx(j), C(j))=Dx(j)+C(j)$$

where C(j) is a correction coefficient.

As a function for calculating the degree of influence on the lifetime, the sum of the torque load Dx(j) and the correction coefficient C(j) has been described as an example; however, the product thereof may be employed, or other more complicated calculation methods may be employed.

Also, for each of the postures of the robot 3, damage amounts Sx(j) on each of the operating shafts of the robot 3 are added up so as to account for all of the operating shafts, and thus, the degrees of influence Sa(x) on the lifetime of the robot 3 are calculated and stored in the respective grid squares on the grid map.

$$Sa(x)=Sx(1)+Sx(2)+\ldots+Sx(6)$$

The calculated degrees of influence Sa(x) on the lifetime are stored together with the center positions Zk of the grid squares, the postures Px(j) of the robot 3, and the posture rm of the AGV 2.

After the degrees of influence Sa(x) on the lifetime of the robot 3 are calculated for all of the selected grid squares, a grid square having the lowest degree of influence Sa(x) is selected. In the case in which there are multiple grid squares having the lowest degree of influence Sa(x), the grid square is determined in accordance with, for example, the following conditions. The conditions are not limited to the following conditions.

The distance from the center coordinates Z0 of the AGV 2, set as the initial value, to the center position of the grid square is small.

The distance from the origin (first axis) of the robot coordinate system to the workpiece W is small.

The maximum value of the damage amounts Sx(j) of the respective operating shafts is low.

The reference position of the AGV 2 is matched with the center coordinates of a grid square stored in correspondence to the thus-determined lowest degree of influence Sa(x), the AGV 2 is set in the stored posture rm, and the robot 3 is set in the stored posture Px(j). Accordingly, there is an advantage in that it is possible to grasp the workpiece W in the posture with the lowest degree of influence on the lifetime of the robot 3 without causing the AGV 2 to interfere with the obstacle O.

Note that, with the robot system 1 according to this embodiment, in the case in which the robot 3 mounted on the AGV 2 grasps the workpiece W with the hand 12, the position and the posture of the AGV 2 are calculated so that a posture in which the torque loads on the respective operating shafts become the lowest is achieved. Alternatively, the position and the posture of the AGV 2 at which the torque loads in a route that the robot 3 and the AGV 2 take during operation become the lowest may be calculated. In this case, the calculation may be performed for one or more relay points of a route in which the grasped workpiece W is transported.

In this embodiment, the torque loads of the respective operating shafts are detected by the torque sensors 11; however, alternatively, the torque loads may be detected on the basis of driving currents of motors (not shown) included at the respective operating shafts.

In addition, the torque loads may be detected by torque sensors 11 provided at the respective operating shafts, or the torque loads may be detected by means of, for example, a six-axis force sensor provided in the base 6.

In the case of a six-axis articulated robot, the torque loads may be detected for all of the operating shafts of the six axes or the torque loads may be detected for at least one of the operating shafts.

The torque loads are detected by the torque sensors 11 mounted on the robot 3; however, alternatively, the loads on the respective operating shafts may be estimated by measuring deflection or the like of the robot 3 from outside the robot 3.

In the case in which the AGV 2 includes a lifting mechanism that lifts the robot 3, it is possible to select a posture in which the torque loads are lower by calculating the postures Px(j) of the robot 3 by placing the robot 3 at different heights by means of the lifting mechanism.

In the case in which the same work is repeatedly performed by the robot 3, torque loads are sometimes continuously applied to some of the operating shafts. In such a case, the correction value C(j) may be adjusted on the basis of operation records.

The damage amounts Sx(j) of the respective operating shafts calculated at a prescribed timing, for example, at a timing before starting the operation for a day, etc., are added up, and thus, a total damage amount Sp(j) for each of the operating shafts is calculated. Then, a value obtained by multiplying the correction value C(j) by the total damage amount Sp(j) is substituted as a new correction value C(j).

Accordingly, changing the total damage amount Sp(j) affords the following effect.

For example, in the case in which the correction values C(j) are [1, 2, 1, 1, 1, 1], there are two posture candidates, and torque loads estimated in the respective postures are D1(j), namely, [10, 30, 10, 10, 10, 10], and D2(j), namely, [10, 20, 30, 20, 10, 10], the damage amounts S(j) and the degrees of influence Sa on the lifetime are as follows.

$S1(j)=[10,60,10,10,10,10]$ and $Sa1=110$ $S2(j)=[10,40,30,20,10,10]$ and $Sa2=120$ In this case, the first posture is selected.

In the case in which the total damage amounts Sp(j) are [20, 80, 20, 20, 20, 20], calculating new correction values C(j) by assuming that the correction coefficients Dc(j) are [0.1, 0.1, 0.1, 0.1, 0.1, 0.1] gives the following.

$C(j)=C(j) \times Sp(j) \times Dc(j)=[2,8,2,2,2,2]$

Then, calculating the damage amounts S(j) and the degrees of influence Sa on the lifetime by employing the newly calculated correction values C(j) gives the following.

$S1(j)=[20,240,20,20,20,20]$ and $Sa1=340$ $S2(j)=[20,160,60,20,20,20]$ and $Sa2=300$ In this case, the second posture is selected.

Specifically, updating the correction values on the basis of the total damage amounts affords an advantage in that it is possible to increase the lifetime of the robot 3 by avoiding selection of postures in which large torque loads are continuously applied to specific operating shafts.

In the above-described calculation examples, the new correction values are calculated by multiplying the correction values by the total damage amounts; however, the calculations may be performed by means of other computations, such as addition.

Instead of employing the total damage amounts Sp(j) in which the damage amounts S(j) are added up, duties, which are values obtained by integrating current values or torque values during a series of motions of the robot 3, may be employed as the total damage amounts Sp(j).

In this embodiment, the destination of the AGV 2 on which the robot 3 is mounted is set at a position at which the torque loads acting on the robot 3 are reduced; however, alternatively, the destination setting may be applied to a case in which the robot 3 is mounted on a handcart (movement mechanism).

In this case, the handcart may include a notification device that is capable of issuing information notification, for example, a monitor, a speaker, LEDs, etc., and the destination of the handcart may be notified to an operator pushing the handcart.

In the case in which the notification device is a monitor or a speaker, the moving direction of the handcart and the distance to the destination may be notified by means of displays or sounds. In addition, sounds or light of different patterns may be employed to issue a notification about an approach to an obstacle O or an approach to the destination.

In this embodiment, the case in which the robot 3 is mounted on the AGV 2 has been described as an example; however, alternatively, this embodiment may be applied to a case in which the workpiece W is transported by being mounted on an AGV 2, a handcart, a robot 3, or a movement mechanism such as a stage.

The case in which the robot 3 is mounted on the AGV 2 or the handcart has been described; however, the robot 3 may be mounted on another robot (movement mechanism).

In this embodiment, the AGV 2 and the robot 3 include the workpiece sensor 13 and the obstacle sensor 5 that detect the workpiece W and the obstacle O; however, the workpiece sensor 13 and the obstacle sensor 5 may employ a common sensor. In addition, the workpiece sensor 13 and the obstacle sensor 5 may be provided on external walls of the AGV 2 and the robot 3, a frame, or a ceiling.

In addition, in this embodiment, a posture of the robot 3 in which the set posture of the hand 12 can be achieved is calculated, and the torque loads that act on the respective operating shafts in the posture are estimated. In this case, the robot 3 may be actually disposed in the calculated posture, the torque loads on the respective operating shafts may be repeatedly measured multiple times by means of the torque sensors 11, and thus, learning may be performed so as to minimize the differences between the estimated torque loads and the actually measured torque loads. Accordingly, it is possible to optimize the function used when estimating the torque loads. In addition, deep learning may be employed by inputting and outputting the differences between the estimated torque loads and the actually measured torque loads.

The invention claimed is:

1. A robot system, comprising:
a robot on which a hand for handling a workpiece is mounted;
a movement mechanism configured to change relative positions of the robot and the workpiece;
a workpiece sensor configured to detect a position of the workpiece with respect to the robot;
an obstacle sensor configured to detect a position of a surrounding obstacle with respect to the movement mechanism; and
a control device that controls the robot and the movement mechanism, wherein
the robot comprises a load sensor configured to detect a load acting on at least one of operating shafts of the robot, and
the control device is configured to:
generates a first map that indicates arrangements of the workpiece and the obstacle from the position of the workpiece detected by the workpiece sensor and the position of the obstacle detected by the obstacle sensor,
generates a second map that indicates a degree of influence on a lifetime of the robot for each of the relative positions set by the movement mechanism on a basis of the load detected by the load sensor when the workpiece is lifted up by the hand, and
determines the relative positions set by the movement mechanism on a basis of the generated first map and second map.

2. The robot system according to claim 1, wherein:
one of the robot and the workpiece is moved by the movement mechanism; and
the second map is a grid map that is created inside a circle centered on coordinates of another one of the robot and the workpiece.

3. The robot system according to claim 2, wherein the degree of influence on the lifetime of the robot is calculated on a basis of the load detected by the load sensor and a posture of the robot separately calculated for each of grid squares of the grid map from the relative positions.

4. The robot system according to claims 1, wherein:
the robot is mounted on the movement mechanism; and
the second map is separately generated for each of postures of the movement mechanism.

5. The robot system according to claim 3, wherein:
damage amounts of the respective operating shafts are calculated on a basis of the loads of one or more operating shafts estimated from the posture of the robot; and
a total value of the damage amounts of the plurality of operating shafts is calculated as the degree of influence on the lifetime of the robot.

6. The robot system according to claim 5, wherein a total damage amount, in which the damage amounts calculated during a series of operations of the robot are separately integrated for each of the operating shafts, is calculated, and the total damage amount is reflected in the calculating of the damage amounts as a weight.

7. The robot system according to claim 5, wherein:
each of the operating shafts is driven by a motor; and
a total damage amount is calculated by integrating current values or torque values of the motor during a series of operations of the robot, and the total damage amount is reflected in the calculating of the damage amounts as a weight.

8. The robot system according to claims 5, wherein calculations for estimating the loads of the operating shafts from the posture of the robot are optimized by learning.

* * * * *